United States Patent [19]

Loewrigkeit et al.

[11] 4,160,065
[45] Jul. 3, 1979

[54] POLYURETHANE LATEXES FROM NCO PREPOLYMERS CHAIN EXTENDED WITH POLYEPOXIDES, POLYANHYDRIDES OR POLYALDEHYDES, AND LAYERED PRODUCTS

[75] Inventors: Peter Loewrigkeit, Wyckoff; Kenneth A. Van Dyk, Franklin Lakes; Thomas T. McGimpsey, Newark, all of N.J.

[73] Assignee: Witco Chemical Corporation, New York, N.Y.

[21] Appl. No.: 750,476

[22] Filed: Dec. 14, 1976

[51] Int. Cl.$^2$ ............... C08G 12/06; C08G 18/34; C08G 18/32; C08G 18/30
[52] U.S. Cl. ............... 428/425; 260/29.2 TN; 260/29.4 R; 260/29.4 UA; 528/59; 528/60; 525/454; 525/456
[58] Field of Search ............... 260/29.2 TN, 29.4 R, 260/29.4 UA, 29.6 NR; 428/425

[56] References Cited

U.S. PATENT DOCUMENTS

| | | | |
|---|---|---|---|
| 3,479,310 | 11/1969 | Dieterich et al. | 260/29.2 TN |
| 3,756,992 | 9/1973 | Dieterich et al. | 260/29.2 TN |
| 3,813,361 | 5/1974 | Gillis et al. | 260/29.2 TN |
| 3,873,484 | 3/1975 | Bluestein et al. | 260/29.2 TN |
| 3,925,181 | 12/1975 | McGinniss | 260/29.2 TN |
| 3,931,116 | 1/1976 | Bernstein et al. | 260/29.2 TN |
| 3,971,745 | 7/1976 | Carlson et al. | 260/29.2 TN |
| 4,008,196 | 2/1977 | Matsuda et al. | 260/29.2 TN |
| 4,012,349 | 3/1977 | Matsuda et al. | 260/29.2 TN |
| 4,016,120 | 4/1977 | Matsuda et al. | 260/29.2 TN |
| 4,016,123 | 4/1977 | Matsuda et al. | 260/29.2 TN |

Primary Examiner—Murray Tillman
Assistant Examiner—A. H. Koeckert
Attorney, Agent, or Firm—Albert L. Gazzola; Morton Friedman

[57] ABSTRACT

A latex suitable for forming improved water-resistant polyurethane products. The latex is prepared in an aqueous system by reacting an NCO-terminated, quaternized, preferably linear, polyurethane prepolymer with water and chain-extending the resulting polyurethane-urea with a difunctional or polyfunctional reagent containing groups reactive with primary amino groups, such as epoxy groups, anhydrides and aldehydes, thus increasing the molecular weight of said polyurethane-urea. The latex thus formed can be dried into highly water-resistant films, coatings, and the like.

27 Claims, No Drawings

POLYURETHANE LATEXES FROM NCO PREPOLYMERS CHAIN EXTENDED WITH POLYEPOXIDES, POLYANHYDRIDES OR POLYALDEHYDES, AND LAYERED PRODUCTS

This application is directed to providing improved water-resistant polyurethane products from stable latices of certain chain-extended quaternized polyurethane-ureas.

A variety of water-dispersable polyurethanes are known in the art. For example, U.S. Pat. Nos. 3,873,484 issued to Bluestein et al on Mar. 25, 1975 and 3,758,427 issued to Katsibas on Sept. 11, 1973 are both directed to such materials and these patents are incorporated herein by reference. The former patent is directed to a latex of a quaternized polyether-dialkanolamine polyisocyanate prepolymer, chain-extended with water in the presence of an ethoxylated alkyl phenol emulsifier.

A problem which is commonly met in films formed from latices without cross-linking through post-curing, is their ready degradation, at least as regards physical and mechanical properties, following exposure to, and especially immersion in, water.

In accordance with the present invention, a film-forming latex is provided which is stable at ambient temperatures, which provides products upon drying having superior structural and mechanical properties, and which products resist degradation of structural/mechanical properties upon exposure to, or immersion in, water. The present latex is formed by the direct mixture in an aqueous system of an isocyanate terminated quaternized polyurethane prepolymer and a chain-extending reagent which is reactive with primary amines. Preferably, the latex is formed in the presence of suitable surfactants, and/or emulsifying agents, as known in the art.

According to the present invention, a latex is prepared from which adhesives and skin-coat films, for instance, having excellent resistance to water and improved physical and mechanical properties can be formed by drying the latex.

It is an advantage of the present invention that the present latex may be dried without applying heat, to form films, coatings and laminates, for instance, without sacrificing the properties of the dried product. Heat may be applied, however, to accelerate the drying.

The prepolymer which is utilized in accordance with the present invention is a quaternized, isocyanate-terminated polyurethane. The prepolymer can be, generally, prepared by the reaction of a polyol, a polyisocyanate, a tertiary alkanolamine and a quaternizing agent.

In accordance with the process of the present invention, the NCO terminated quaternized prepolymer is reacted with an excess of water to produce an amine-terminated polyurethane-urea in a latex. The polyurethane-urea further reacts with an amine-reactive reagent, to form the desired chain extended polymeric product having a higher molecular weight. Preferably, the amine-reactive reagent is added substantially together with the water.

The polyol and mixture of polyols utilized for the preparation of the prepolymer has a hydroxyl number preferably in the range of from about 10 to about 200, most preferably in the range of from about 20 to about 80 and optimally from about 30 to about 60, and is preferably a diol or a triol, most preferably an alkoxylated ether diol or alkoxylated ether triol; optimally a mixture of an alkoxylated diol and a low molecular weight alkyl triol is utilized. By utilizing a minor proportion by weight of an alkyl triol, such as glycerine or trimethylolpropane, for instance, in combination with a major proportion by weight of an alkoxylated diol, a highly desirable, slightly branched prepolymer configuration is obtained. By a minor proportion is meant up to about 10% of an alkyl triol, based on the weight of the diol.

The polyol can also comprise, alternatively, a polyhydroxy-containing polyester. Such a compound preferably comprises a dihydroxy or a trihydroxy compound and, optimally, the dihydroxy polyol is utilized.

Polyether type polyols are most commonly derived from simple alkane diols, polymerized by reaction with an alkylene oxide, for example, to form the corresponding polyoxyalkylene polyether polyols. The preferred polyol monomer can be selected from among the glycols, such as neopentylglycol, ethyleneglycol, diethyleneglycol, hexamethyleneglycol, 1,4- and 1,3-butyleneglycols, 1,3- and 1,2-propyleneglycols, and the corresponding dipropyleneglycols. The most useful monomeric triols include the alkyl triols, such as trimethylolethane, trimethylolpropane, 1,2,4-butanetriol, 1,2,6-hexanetriol, glycerol, and triethanolamine. Aromatic polyols can also be used, such as trihydroxymethyl benzene. The alkylene oxides used in preparing the polyether polyols preferably are those which contain from two to about four carbon atoms, for example, ethylene oxide, 1,2-propylene oxide and 1,2-butylene oxide, and homopolymers and copolymers thereof. The polyhydric, polyalkylene ether can also be prepared from reagents such as glycidol and cyclic ethers, such as tetramethylene ethers, and the epihalohydrins, e.g., epichlorohydrin. The polyaralkylene ether polyols are derived from the corresponding aralkylene oxides, such as for example, styrene oxide, alone or mixed with alkylene oxide. Generally, 1,2-propylene oxide, and mixtures of 1,2-propylene oxide and ethylene oxide are preferred for the preparation of the polyether polyol reactant. The polyol polyethers are useful in the present invention preferably at a molecular weight of from about 500 to about 8,000, most preferably from 2,000 to about 6,500, and optimally not greater than about 5,000, and a hydroxy functionality of at least about 1.5 up to about 8, and preferably an average hydroxy functionality of from about 2.0 to about 5.

Generally, the polyester polyol compounds useful for preparing the prepolymer in accordance with the present invention, can be prepared by, for example, the reaction of a polyhydric alcohol with a polycarboxylic acid, generally each containing from about two to twenty carbon atoms. The polycarboxylic acid can be not only the free carboxylic acid, but such acid precursors as the corresponding acid anhydrides or acid halides or even, for example, alykl esters. The preferred acids are the dicarboxylic acids containing from about 4 to about 12 carbon atoms. Examples of the preferred carboxylic acid components include, for example, aromatic acids such as phthalic acid, terephthalic acid, isophthalic acid, tetrachlorophthalic acid; cycloaliphatic acids, such as dimerized linoleic acid, maleated and fumarated rosin acids, and cyclohexane-1,4-diacetic acid; but preferably include the aliphatic acids, such as oxydipropionic, succinic, glutaric, adipic, azelaic, suberic, and sebacic acids, or combinations of such acids. Lactones which can be used in place of the polyester polyols include those such as gamma-butyrolactone, or epsilon-caprolactones. The glycols which can be utilized in the preparation of the prepolymer polyesters include any of those set forth above for the preparation of the polyether polyols. Generally, however, a dihydric polyol is preferred when preparing the polyester even more than when preparing the polyether polyol.

The polyester polyol reactants preferably have a molecular weight of at least about 500 and optimally between about 2,000 and 6,000. Generally, the maximum molecular weight, for both the polyether and the polyester polyols, is limited primarily by the difficulty of mixing such a material with the other ingredients in the procedure. Thus, the higher molecular weight ingredients are useful, but because of the difficulty of working with them, they are not considered economical or practical and, therefore, are less preferred. Extremely powerful mixing apparatus must be provided when dealing with such high molecular weight materials.

The organic polyisocyanates useful in preparing the prepolymer compound in accordance with the present invention include those which contain at least two isocyanate groups per molecule, and may contain two or three isocyanate groups. The useful isocyanates include, for example, the aromatic, aliphatic, and cycloaliphatic polyisocyanates. Most preferably a diisocyanate is utilized. Suitable organic polyisocyanates include, for example, n-butylene diisocyanate, methylene diisocyanate, m-xylylene diisocyanate, p-xylylene diisocyanate, cyclohexyl-1,4-diisocyanate, dicyclohexylmethane-4,4'-diisocyanate, m-phenylene diisocyanate, p-phenylene diisocyanate, 3-(alphaisocyanatoethyl)-phenyl isocyanate, 2,6-diethylbenzene-1,4-di-isocyanate, diphenyl-dimethylmethane-4,4'-diisocyanate, ethylidene diisocyanate, propylene-1,2-diisocyanate, cyclohexylene-1,2-diisocyanate, 2,4-tolylene diisocyanate, 2,6-tolylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, diphenyl-methane diisocyanate, 1,6-hexamethylene diisocyanate and isophorone diisocyanate.

The aromatic diisocyanates and the polycyclic aliphatic diisocyanates are preferred. The diisocyanates which have been found most useful in the preparation of the prepolymers are, specifically, the tolylene diisocyanate isomers and -dicyclohexyl-methyl-diisocyanate.

In accordance with a preferred aspect of the present invention, tertiary alkanolamine, and most preferably a tertiary dialkanolamine, is reacted with the polyol and polyisocyanate. The tertiary dialkanolamine is preferably an N-alkyl dialkanolamine, wherein the alkyl groups can include alkyl and cycloalkyl having up to about 6 carbon atoms. The alkanol group preferably has no more than about 4 carbon atoms per hydroxy group. The useful such compounds include, for example, N-methyl diethanolamine, N-methyl dipropanolamine, N-methyl diisopropanolamine, N-propyl diethanolamine, N-hexyldiethanolamine, N-cyclohexyldipropanolamine, 3-dimethylamino hexanediol and 2-dimethylamino ethanol, and the like. The latter monoalkanol amine is reacted with a triisocyanate, mol for mol, for instance, to yield a diisocyanate having a tertiary amine which in turn is reacted with a polyol and then a dialkyl sulfate, to yield a quaternized isocyanate terminated prepolymer.

Generally, in carrying out the urethane prepolymerization reactions, the only significant groups in the reactant compounds are the isocyanate groups and the hydroxyl groups which are reactive therewith. Any other group can be present in the reactants or in the final urethane polymer, so long as the group does not interfere with, i.e. is inert to, the desired isocyanate/hydroxyl reaction as well as the quaternizing reaction and the subsequent chain-extending reactions between the prepolymer and water and the amine-reactive reagent. Thus, acyclic, alicyclic, aromatic and heterocyclic groups can all be present on any of the reactive compounds as long as they are "inert." Similarly, inert substituent groups, such as certain halogens, can be present as long as they do not interfere with any of these reactions.

Although any suitable monofunctional quaternizing agent can be utilized in preparing a prepolymer useful in the present invention, a di(loweralkyl) sulphate is preferred. The lower alkyl groups most preferably contain up to about 6 carbon atoms each and include, for example methyl, ethyl, n-propyl, isopropyl, etc. Dimethylsulphate is most preferred because of its ready availability and low cost.

A catalyst is preferably present to increase the rate of reaction, especially between the polyisocyanate and the polyol. Catalysts which are useful for this reaction are well known in the art and include, for example, metal catalysts such as tin compounds and iron compounds, as well as other metal compounds, such as compounds of cobalt, lead, vanadium, chromium, tungsten, antimony and titanium. Most preferred are the tin compounds, which include the stannous salts, e.g. stannous octoate, stannous acetate, and stannous oleate, the stannic salts, e.g. stannic diacetate, and stannic di-octoate, and also the covalently-linked, socalled organotin compounds, such as the dialkyltin dicarboxylate salts, including, for example, dibutyltin diactate, and dibutyltin dilaurate, and tributyltin oxide.

The preparation of the quaternized isocyanate terminated prepolymer, as described above, is conventional in the art, and the various materials useful for forming such a prepolymer are generally described in the literature, for example, in the text, *Polyurethanes: Chemistry and Technology*, by Saunders and Frisch, published by Interscience Publishers (New York, 1964); also see U.S. Pat. No. 3,873,484, mentioned supra. The preparation of the quaternized isocyanate terminated prepolymer forms no part of the present invention. It is only with the specific latex made from this prepolymer which comprises the present invention.

The prepolymer is generally prepared in an anhydrous medium, and can include the presence of an inert diluent, or solvent medium. The presence of solvent is optional, and can be avoided depending upon the state and viscosity, if liquid, of the various reagents. Generally, not more than about 30% of an organic solvent is utilized, if any. Any suitable inert organic solvent can be utilized, and the term "inert" in this context refers to an ingredient which does not enter into, nor interfere with, the course of the prepolymerization or quaternization reactions. Useful such solvents include, preferably, acetone and other water-soluble materials. Other useful solvents include, for example, tetrahydrofuran, dimethylformamide, ethylacetate, benzene, dioxane, and the like. The solvent most preferably has a boiling point in the range of from about 40° to about 90° C., in order to facilitate separation of the solvent from water.

The proportions of the polyisocyanate reaction to the polyhydric reactant, including one or more polyols, can be varied as one means of changing the properties of the polyurethane latex product. In preparing the prepolymer, generally the total isocyanate (—NCO) equivalent-to-total hydroxy equivalent, should be such as to provide from about 1.6 to about 2.4 equivalents of the hydroxy to about 3 to about 5 equivalents of the isocyanate. Preferably, the proportions of the major reagents in the prepolymer reaction mixture are as follows:
  polyol about 0.8 to about 1.2 equivalents
  N-alkyl dialkanolamine about 0.8 to about 1.2 equivalents
  polyisocyanate about 3 to about 5 equivalents
  dialkylsulfate about 0.4 to about 0.6 equivalents The isocyanate terminated prepolymer latex, in accordance with the present invention, comprises a terminal isocyanate (—NCO) content within the range of from about 0.5% to about 10% by weight, and most preferably in the range from about 2.5% to about 7% by weight of prepolymer.

As stated above, the prepolymer is generally prepared in anhydrous medium. The addition of a solvent, as explained above, is optional and depends upon the viscosity and state of the various reagents utilized and the apparatus which is available for carrying out the process. The reaction is generally carried out at a temperature somewhat above room temperature, as the result of the reaction exotherm. Additional heat is generally not required. The reaction can be carried out at a temperature of from room temperature to even lower up to the natural exotherm temperature of the reaction, which should generally be maintained at below about 125° C. and preferably at no greater than about 60° C. Higher temperatures can be utilized; but are not preferred because of concurrent side reactions at higher temperatures.

The reaction is generally initiated by admixing the polymeric polyol, such as the polyether polyol or polyester polyol, e.g., diol and/or triol, with a tertiary alkanolamine and the polyisoccyanate. Following substantial completion of this reaction, and cooling to almost room temperature, the prepolymer is quaternized by the addition of the quaternizing agent, for example, the dialkylsulphate. In a most preferred embodiment for preparing the present prepolymer, about one equivalent weight of a diol, such as a polyoxyalkylene glycol, or about one equivalent of a polyoxyalkylene triol, or a mixture thereof, is admixed with about one hydroxyl equivalent of an N-alkyl dialkanolamine and about four equivalents of an organic polyisocyanate, most preferably, a diisocyanate. The resultant reaction mixture is then quaternized with about 0.5 equivalent of a monofunctional quaternizing agent, such as a dialkylsulphate.

The prepolymer, as finally quaternized, generally has an average molecular weight in the range of from about 500 to about 100,000; however, the molecular weight of the prepolymer is estimated and does not form a critical part of the present invention.

The prepolymer as prepared above is polyfunctional, and preferably either difunctional or trifunctional. The prepolymer can be linear, but also includes the product of trifunctional polyols and/or polyisocyanates.

The final latex prepared in accordance with the present invention is preferably polymerized in a single aqueous system: the prepolymer initially reacts with water, and is partially chain-extended to form an amine terminated polyurethane-urea, which then reacts further with an amine-reactive reagent to produce a higher molecular weight polyurethane-urea in latex form.

The final latex preferably contains from about 25 to 70% by weight of solids in water and most preferably from about 30 to about 65% by weight of solids.

Preferably, the polyfunctional amine-reactive reagent is di- or trifunctional in any of the following preferred reactive groups: epoxides, cyclic anhydrides, and aldehydes. Generally, a compound containing at least two of the amine-reactive groups can be used in accordance with the present invention, as long as the remaining structure of the compound does not interfere with the desired reaction, nor can the resultant structure have a negative effect upon the ability of the final chain-extended polymer to sustain a stable latex.

Generally, the amine-reactive reagent is present in an amount of from about 1 to about 20% by weight of the prepolymer, and preferably in an amount of not greater than about 15% by weight of the prepolymer. Generally, sufficient water is present to fully convert the isocyanate groups to amine groups and further to provide sufficient additional water to obtain a latex containing up to about 70% by weight of the polyurethane solids.

The preferred amine-reactive compounds are the poly-epoxides, and most preferably the di-epoxides and/or the tri-epoxides, having terminal epoxy groups such as the triglycidyl ethers and diglycidyl ethers. Useful such materials include, for example, the glycidyl ethers of polyhydric phenols, bis-phenols, glycerine, polyoxyalkylene glycols, and epoxidized esters such as the synthetic or naturally occurring fatty esters, or oils, including, for example, diglycidyl phthalate, diglycidyl terephthalate, diglycidyl adipate, diglycidyl glutarate, diglycidyl succinate, diglycidyl oxalate, and epoxidized soya oil; alicyclic epoxides, such as limonene dioxide, dicyclopentadiene dioxide, vinyl cyclohexane dioxide, 3,4-epoxy-6-methylcyclohexyl methyl-3,4-epoxy-6-methylcyclohexane carboxylate; aliphatic ether type epoxides, such as ethylene glycol diglycidyl ether, diethylene glycol diglycidyl ether, triethylene glycol diglycidyl ether, diethylene glycol triglycidyl ether, 1,2-propylene glycol diglycidyl ether, 1,4-butylene glycol diglycidyl ether, 1,2-propylene glycol triglycidyl ether, 1,5-pentane diol diglycidyl ether, glycerine diglycidyl ether, glycerine triglycidyl ether, the condensation products of bis-phenols, such as bis-phenol A, or bis-phenol S, with an epihalohydrin, such as epichlorohydrin; 1,2,3-tris (2,3-epoxypropoxy) propane; the triglycidyl ether of glycerol; the so-called epoxy novolac resins; epoxy emulsions and water-soluble diepoxides generally. The corresponding epithio ethers wherein the epoxy oxygen is replaced with sulfur can also be used.

The useful polyfunctional cyclic anhydride compounds include, for example, the anhydrides of dicarboxylic acids, generally pre-reacted with a co-monomer to form either a hydrocarbon or an oxyhydrocarbon co-polymer, such as the reaction product of styrene with maleic anhydride, ethylene with maleic anhydride, methylvinylether with maleic anhydride, and other polyoxyalkylated anhydrides, as known in the art.

Useful polyfunctional aldehyde reagents, reactive with the primary amine grouping, include preferably the dialdehydes, and if desired, trialdehydes, and include, for example, glyoxal, pyruvic aldehyde, glutaric dialdehyde, and the like, as known in the art.

It is recognized in the art that the preparation of commercially useful latices requires the careful balancing of a large number of factors, including not only the reacting prepolymer, water and amine-reactive reagent, which are the actual reagents in this system, but also subsidiary materials which are necessary to obtain a suitable product, and include, for example, catalysts, surfactants, including both emulsifying agents and anti-foaming agents, and final resin additives, in order to attain a suitable, or optimal, product. The order of addition of certain of the major reagents is also important; for example, any polyaldehyde reagents, such as glyoxal, should not be added until after the chain-extending reaction between water and the prepolymer has been completed.

Although the chain-extending reaction between water and the prepolymer proceeds per se, the art generally prefers to utilize a catalyst to carry out the reaction commercially. The various catalysts useful for this chain extending reaction are well known in the art, and reference is made, for example, to Saunders & Frisch, supra. It is commonly understood that the tertiary amines are a preferred and most effective catalyst, which tend to favor the reaction between isocyanate and water. Useful such amine catalysts include, for example, triethylene diamine, N-ethylmorpholine, N,N,N',N'-tetramethyl-1,3-butanediamine, and bis-2-(N,N-dimethylamino)-ethyl ether. Mixtures of tertiary amines are generally used commercially.

It is often desirable for ease of application, to thicken the latex, i.e., increase its viscosity. Useful thickeners for the latex used in the present invention, include, for example, copolymers of polyvinyl pyrrolidone and the cellulose ether derivatives, such as, for example, hydroxypropyl methylcellulose, e.g., Methocel. The thickening can also be attained by the utilization of solid filler materials, such as the calcined clays or hydrated alumina, which are very fine particulate powders, compatible at up to 50% by weight of the total latex solids. At the higher concentrations of such filler materials, a mastic is formed. Certain of the filler materials are useful as pigment agents and include, for example, carbon black and other conventional pigment materials which provide a white or other color to the final resin film. For use as a pigment, generally only from about 0.5 to about 15% by weight is necessary. The pigments or fillers are preferably added as dispersions, either in aqueous or non-aqueous systems. The non-aqueous systems, are generally, preferably, at least partially miscible in water. If desired, however, the particulate material can be added directly as a powder.

Inhibitors against discoloration and aging, such as any of the well known antioxidants and ultraviolet screening materials can also be added to the latex of the present invention as desired for the particular purpose for which a film is to be used. Plasticizing agents can also be utilized, such as the phosphate esters, which, in addition to their plasticizing activity also act as emulsifiers, especially in combination with the alkoxylated alkylphenols.

The latices which are obtained in accordance with the present invention are generally stable at ambient temperatures, and can be used to produce films, for instance, which have reproduceable, consistent properties, including especially water resistance and adhesion.

Where special properties, such as a slippery, leather-like feel, is preferred, other additives may be provided in the prepolymer reaction mixture in water. For example, slip agents, e.g., silicone fluids of known properties, can be added to produce a leather-like feel. Such additional properties are generally conventional in the art, and are well known now, or may be developed in the future. All such additives, which are compatible, and not reactive with the latex polymer in accordance with the present invention, and which especially do not cause any degradation of the properties, can be utilized in full accord with the present invention.

The following are examples of the products and the processes for preparing said products according to this invention. The examples are not intended to be exclusive of the full scope of this invention, but merely set out certain preferred embodiments thereof.

In the following examples, the films which are formed from the latices in accordance with the present invention, are tested for tensile strength and elongation in accordance with standard tests described in ASTM D-882-67. Hydrolytic stability of the film is determined by immersion in water at 70° C. for 24 hours. The perchloroethylene resistance is determined by immersion in such material at 25° C. for 24 hours. The equivalent weights in all the examples are determined by actual analysis.

EXAMPLE 1

A. Prepolymer Preparation

A diisocyanate prepolymer is prepared utilizing the following materials:

|  | Weight | Equivalence |
|---|---|---|
| Polyoxypropylene glycol (OH No.=56) | 104.6 (lbs) | 0.1 |
| Trimethylolpropane (TMP) | 0.787 | 0.018 |
| N-methyldiethanolamine (NMDEA) | 5.95 | 0.100 |
| Methylene bis(4-cyclohexyl isocyanate) (MBCI) | 55.3 | 0.4 |
| Dimethyl sulfate (DMS) | 6.3 | 0.05 |
| Acetone | 71.0 | — |
| Dibutyltin dilaurate | 12 grams | — |

The polyoxypropylene glycol is charged to a 30 gallon reactor using vacuum suction, and then heated to 90°–95° C. under 5 MM Hg pressure for 30 minutes to remove residual water. Dry nitrogen is then blanketed over the dried glycol and the TMP and NMDEA are charged while the mixture is permitted to cool to 25° C. The MBCI is added, again with vacuum suction, followed by the addition of the dibutyltin dilaurate catalyst. Without the addition of extraneous heat, the reaction mixture exotherms to 50° C. within one hour. The reaction mixture is then stirred for an additional three hours. The —NCO content is 4.8% by weight, indicating substantially complete reaction between the glycol and the diisocyanate.

The acetone and dimethylsulfate are then added, which result in a further exotherm warming the mixture to from 35° C. to 41° C. over one-half hour. Mixing is continued for an additional hour until the free —NCO content is 3.1% by weight, indicating the prepolymer preparation is complete. The viscosity of the prepolymer utilizing a Brookfield Viscometer, at 22° C., is found to be 625 cps.

B. Preparation of Latex

A stable aqueous latex emulsion is prepared from the following materials:

| | Weight % (based on prepolymer solids) | Weight Used (lbs.) |
|---|---|---|
| Prepolymer (3.1%-NCO) | — | 80.0 |
| Diglycidyl ether of bisphenol A[1] | 5.0 | 2.84 |
| Tributoxy ethyl phosphate (KP140)[2] | 1.0 | 0.57 |
| Nonylphenoxypoly (oxyethylene) ethanol[3] | 2.0 | 1.14 |
| Cetyl alcohol | 0.2 | 0.11 |
| 4,4'-butylidene bis (6-tertbutyl-m-cresol) | 1.0 | 0.57 |
| Substituted hydroxyphenyl benzotriazole[4] | 0.25 | 0.14 |
| Acetone | — | 2.0 |
| Water (deionized) | — | 175.0 |
| Triethylenediamine | 0.01 | (2.9 gms) |
| Defoaming agent[5] | — | (less than 100 gms) |

[1] Sold under the trademark "Epon 830" by Shell Chemical Co.
[2] Plasticizer, sold by FMC
[3] Derived from nonylphenol and ethyleneoxide, sold under the trademark "Igepal CO730", by GAF.
[4] Sold under the trademark "Tinuvin 328", sold by Ciba-Geigy.
[5] Sold under the trademark "Balab Bubble Breaker 3056A" by Witco Chemical Corporation The prepolymer is charged to a 55 gallon drum equipped with a high-speed propeller mixer and cooling coils so as to insure complete mixing and to dissipate the reaction exotherm. With vigorous mixing, the following materials are added: Epon 830, KP140, Igepal CO730, and cetyl alcohol. The cetyl alcohol is dissolved in the Igepal by heating to 50° C., before adding to the prepolymer. The antioxidant and the ultraviolet absorber are predissolved in acetone and then added to the prepolymer. After continuing mixing for additional 15 minutes, the water, containing the triethylene diamine catalyst, is added. The reaction mixture is agitated with the high-speed propeller mixer. The temperature of the mixture, during the chain-extension reactions, is prevented from increasing to above about 35° C. During the first hour, an exothermic reaction is accompanied by foaming. A few drops of the defoaming agent should be added to the mixture to dissipate the foam as much as possible while it is forming.

After reacting for approximately four hours, during which time the free isocyanate groups are essentially completely reacted, the reaction mixture, in the form of a latex, is stripped under vacuum for about five hours to remove any dissolved carbon dioxide and acetone. The temperature during the stripping should not be raised to greater than about 45° C. An additional few drops of the defoaming agent can be added during the stripping to reduce any foaming that may occur. The latex thus formed is continually monitored during stripping until the desired solids content is reached.

The final latex solids are 32.6% and the latex viscosity is 180 cps, measured on a Brookfield viscometer at 26° C. The batch is then reheated to 66° C., and held at this temperature for two hours.

The batch is degassed a second time, in accordance with the above procedure, and then immediately cooled to 25° C. and filtered through a 200 micron filter bag into a 55 gallon drum. The filtered product has the following properties:

| | |
|---|---|
| Solids | 33% by weight |
| Viscosity (Brookfield LVF) 25° C. | 150 cps |
| pH (25° C.) | 7.7 |
| Particle size | Less than 1 micron |
| Specific gravity (25° C.) | 1.03 |
| Surface tension | 46 dynes/cm. |
| Stability: pH | 2–10 |
| Mechanical (high sheer) | Excellent |

C. Polymer Film

Wet films of the above latex are drawn on a Mylar sheet, utilizing a doctor blade to a wet thickness of 20 mils. Part of the above wet film is dried overnight at room temperature (about 12 hours) and then subsequently heated to 150° C. for ten minutes. A second part is allowed to dry at R.T. for eight days. Dried films of about 5 mil thickness are formed.

The tensile strength of the dry films as tested in accordance with the procedures of ASTM D-882-67 is about 4,000 to 4,500 psi in each case. The ultimate elongation, is found to be 500% and the modulus of elasticity is 900 psi at 100% and 1900 psi at 300% elongation. The hardness of the film, utilizing a Shore A durometer, is 77.

The hydrolytic and solvent stability of the above films is determined after 24 hours immersion in water at 70° C., and after immersion in perchloroethylene at 25° C. for 24 hours. The tensile strength and elongation values for the solvent and water-immersed film samples were tested while the samples were wet, i.e. immediately after removal from the immersion bath. Other samples were dried after immersion and then tested. Both, the air-dried film samples and the heat-dried samples retain the same properties. The results of these tests are set forth in the following table:

Table 1

| | Water | | Perchloroethylene | |
|---|---|---|---|---|
| | Wet | Dry | Wet | Dry |
| Tensile strength, psi | 2200 | 4300 | 2600 | 4500 |
| Ultimate elongation, % | 500 | 500 | 650 | 450 |
| Modulus, 100%, psi | 600 | 900 | 620 | 1400 |
| 300%, psi | 1180 | 1900 | 1400 | 2800 |

The films formed in accordance with this invention are highly resistant to water spotting and pass long-term hydrolytic stability at 95% R.H. and 70° C.

EXAMPLE II

The process of Example 1 is followed in preparing a latex, to which is then added 0.3% by weight based on total liquid weight, of a hydroxypropylmethyl cellulose (Methocel J75MS) to increase the viscosity of the latex to about 15,000 cps. The thus thickened latex is utilized as a fabric-to-fabric adhesive between two like fabrics. The materials utilized include both synthetic fabrics and natural (cotton) fabrics, and the adhered fabrics are tested for peel strength initially after adhesion and after washing under normal machine wash conditions with warm water (145° F.) and a detergent (Tide). Other samples of the two-ply adhered fabrics are tested for peel strength after immersion for 24 hours in perchloroethylene and methylethylketone (MEK). The tests are run both, while the fabrics were wet and after drying. The peel strength tests are carried out in accordance with the procedures of ASTM D-751-64T. The results of the tests are set forth in Table II below.

As shown, the laminate shows substantially no change in peel strength, after being dried, following either the washing or solvent immersion tests.

Table II

| | Peel Stength | | | | | | |
|---|---|---|---|---|---|---|---|
| | Original | Water/Tide Washed | | Perchloroethylene | | MEK | |
| | Dry (lbs/in) | Wet (lbs/in) | Dry (lbs/in) | Wet (lbs/in) | Dry (lbs/in) | Wet (lbs/in) | Dry (lbs/in) |
| Cotton (510 Sateen) | 14 | 12 | 13 | 8 | 14 | 2 | 12 |
| Arnel Triacetate | 5 | 5 | 6 | 4 | 5 | 0.5 | 4.5 |

Table III

| | Peel Strength | | | | | | |
|---|---|---|---|---|---|---|---|
| | | Washing Test | | Perchloroethylene | | MEK | |
| | Original (lbs/in) | Wet (lbs/in) | Dry (lbs/in) | Wet (lbs/in) | Dry (lbs/in) | Wet (lbs/in) | Dry (lbs/in) |
| Polyester/ Cotton 61313 | 16 | 8 | 14 | 7 | 18 | 3 | 17 |
| Cotton 510 Sateen | 18 | 10 | 16 | 6 | 18 | 2 | 18 |

EXAMPLE III

Laminates of a Sateen cotton cloth and a polyester/cotton cloth each with a polyurethane laquer topcoat, are prepared using the thickened latices of Example 2. A silicone-treated release paper is coated with a polyurethane lacquer top-coat (Witcobond Y-328, Witco Chemical Corporation), and dried at 110° C. in a circulating air oven for 10 minutes. The latex of Example II is applied as a tie-coat to the polyurethane top-coat at a wet thickness of 10-15 mils, and the fabric smoothly applied thereover to complete the laminate. The laminate is dried in a forced air oven at 150° C. for 10 minutes. Peel strength tests of the laminate, utilizing an Instron Tester, are made of each laminate initially and after washing and immersion in solvents, as described above in Example II. The results are set forth in Table III above:

EXAMPLE IV

A latex similar to that of Example I but to which is added 5% by weight based on latex solids of dimethyl formamide (DMF). The latex is utilized as a tie-coat adhesive as described above. The procedure was identical to that of Example II, except the laminate is dried at below 90° C., similar to applying the latex to a temperature-sensitive substrate. The laminate, when dried, exhibits excellent properties, substantially equal to those of Example II, following heat drying.

EXAMPLE V

A. An isocyanate terminated prepolymer was formed from the following ingredients:

| Material | Equivalent Weight | Eq. Used | Wt. (grams) |
|---|---|---|---|
| Polyoxypropylene glycol (PPG) (OH No.=27.2) | 2060.0 | 0.1 | 206.0 |
| Trimethylol propane (TMP) | 44.7 | 0.1 | 4.5 |
| N-methyldiethanolamine (NMDEA) | 59.5 | 0.15 | 8.9 |

-continued

| Material | Equivalent Weight | Eq. Used | Wt. (grams) |
|---|---|---|---|
| Tolyene diisocyanate (TDI - 2,4-2,6) | 88.0 | 0.70 | 61.6 |
| Dimethylsulfate (DMS) | 126.0 | 0.075 | 9.5 |
| Acetone | — | — | 32.3 |

The glycol, TMP and NMDEA are charged to a flask and mixed, and then the diisocyanate is charged. The mixture is permitted to react, the exotherm reaching a temperature of 56° C. After 90 minutes, the mixture is found to have a free-isocyanate (NCO) content of 4.90% by weight. The reaction mixture is then cooled to 30° C. and the acetone and DMS charged to the mixture. After an additional 45 minutes of mixing, the isocyanate content is 4.50%, which indicates that the prepolymer is completely formed.

B. A latex is prepared, utilizing the prepolymer in A above, as follows:

| | weight (grams) |
|---|---|
| Prepolymer | 100.0 |
| Diglycidylether of bisphenol A | 4.5 |
| Ethoxylated nonylphenol | 2.2 |
| Cetyl alcohol | 0.3 |
| Water | 100.0 |

The above materials are mixed as in Example I above. After three hours of mixing, the latex is essentially fully formed and the acetone and carbon dioxide are stripped, again as in Example I, to form a solvent-free latex containing about 50% by weight solids.

C. A film of the material is formed as in Example I, 10 mils thick when wet and 5 mils thick dry. After being dried overnight and conditioned in forced air oven at 130° C. for 10 minutes, the film is found to have a tensile strength of 3000 psi and an ultimate elongation at break of 500%. The material has excellent water resistance, after immersion in 70° C. water for 16 hours. The wet film retains 40% of its original dry tensile strength.

EXAMPLE VI

A. A prepolymer utilizing polyoxytetramethylene glycol is formed from the following materials:

| Material | Equivalent Wt. | Eq. Used | Wt. (grams) |
|---|---|---|---|
| Polyoxytetramethylene glycol* | 1031 | 0.5 | 515.5 |
| TMP | 44.7 | 0.1 | 4.5 |
| NMDEA | 59.5 | 0.4 | 23.8 |
| TDI | 88 | 1.93 | 170.2 |
| DMS | 126 | 0.2 | 25.2 |
| Acetone | — | — | 170 |

*A difunctional polymerization product of tetrahydrofuran, having a Hydroxyl Number of 54.4

The glycol, TMP and NMDEA are charged and mixed in a one liter flask followed by the addition of the TDI. The mixture is permitted to react for two hours at 66° C., after which time the isocyanate content (—NCO) is 5.2%. The acetone and DMS are added to the reaction mixture after it is cooled to below 30° C. After an additional hour of reaction time, with mixing, the NCO content is 4.32%, indicating that the prepolymer is fully formed.

B. A latex is formed utilizing the prepolymer from A (100 g), 2.4 g nonylphenol ethoxylate and 4.0 g of the diglycidyl ether of bisphenol A and 95 g of water. The latex is formed in accordance with the same procedure as set forth above in Example V. and contains 45% by wt. solids.

C. A film utilizing the latex prepared in accordance with B. above following the same procedure as set forth above in Example V, but drying the film at 150° C. The dried film has a tensile strength of 4000 psi and ultimate elongation at break of 425%. After being immersed in 70° C. water for 16 hours, a wet film retains 48% of the original dry tensile strength.

D. A comparative latex is formed following the procedure in accordance with B. above, but without adding a diglycidyl ether. After the formation of the latex in accordance with that procedure, a film is cast according to the procedure in C. above. The dried film has a tensile strength of 3500 psi and ultimate elongation at break at 500%. After immersion in 70° C. water for 16 hours, wet film retained only 30% of its original dry tensile strength. This comparative test shows the substantial increase in water resistance of the material prepared in accordance with this procedure compared to the prior art material.

EXAMPLE VII

A. A prepolymer made from a trifunctional reagent is prepared from the following materials:

| Material | Equivalent Weight | Eq. Used | Wt. (grams) |
|---|---|---|---|
| PPG (OH No. = 53.6) | 1046 | 0.134 | 140.2 |
| PPG (OH No. = 27.2) | 2060 | 0.017 | 35.0 |
| Polyoxypropylene triol[1] | 1000 | 0.102 | 101.7 |
| TMP | 44.7 | 0.07 | 3.1 |
| NMDEA | 59.5 | 0.151 | 9.0 |
| Methylene bis (4-cyclohexyl isocyanate)[2] (MBCI) | 134 | 0.88 | 117.9 |
| DMS | 126 | 0.076 | 9.6 |
| Acetone | — | — | 104.1 |

[1]Fomrez[R] ET-3000, by Witco Chemical Corp. OH No. = 56.1
[2]Hylene[R]W (aliphatic) (E.I. duPont de Nemours & Co.)

The three polyols, i.e. the two polyoxypropylene glycols and the polyoxypropylene triol, are admixed with the TMP and NMDEA in a flask. The isocyanate is then added and the mixture stirred. After two hours at 50° C., the isocyanate content is 4.30% by weight. Acetone and DMS are added to the reaction mixture and stirred for an additional hour. The final isocyanate content is 3.20% by weight, indicating that the prepolymer is fully reacted.

B. A latex is prepared from 100 g of prepolymer in A immediately above, mixed with the following materials: 1.7 grams nonylphenolethoxylate, 0.17 grams cetyl alcohol, 4.3 grams diglycidylether of bisphenol A, 210 grams deionized water, and 0.01 grams of a dipropylene glycol solution of triethylene diamine catalyst. A stable latex was formed in accordance with the procedure in the preceding Example.

C. A film is cast and air-dried over night and then at 110° C. in accordance with the procedure in Example VI. The conditioned film has a tensile strength of 5,000 psi and ultimate elongation at failure of 500%. After immersion in 70° C. water for 16 hours, the wet film retains 60% of its original dry tensile strength.

EXAMPLE VIII

A. A prepolymer is prepared from a polyester precursor utilizing the following materials:

| | Equiv. Weight | Equiv. Used | Wt. Used (gm) |
|---|---|---|---|
| Polyester diol[1] | 969.0 | 0.300 | 291.0 |
| N-methyldiethanolamine (NMDEA) | 59.5 | 0.150 | 8.9 |
| MBCI | 134.0 | 0.810 | 108.5 |
| Dibutyltin Dilaurate | — | — | 3 drops |
| Acetone | | | 46.4 |
| Dimethyl Sulfate | 126.0 | 0.075 | 9.5 |

The polyester diol is first degassed under vacuum at 100° C. for 20 minutes. After cooling the material to 40° C., NMDEA and the bis-isocyanate are added with mixing with 3 drops of the dibutyltin dilaurate catalyst, and mixing continued for about 1½ hours, during which time the temperature rose to a maximum of about 55° C. When the isocyanate content reaches 3.70% by weight, acetone is added, followed by dimethyl sulfate, with continued mixing for about one hour. A completely reacted prepolymer is thus obtained.

B. A latex product is prepared from the polyester prepolymer prepared in A. above by admixing, in the following order: 118 g. polyester prepolymer, 1 gram of an ethoxylated nonyl phenol, 5 grams of an epoxy novolak resin (Epon 154,) in 20 grams of acetone. After these materials are well mixed, 240 g. of deionized water containing 1 drop of triethylene diamine is added and the mixture stirred for an additional two hours. The procedure, after the addition of the catalyst, is substantially the same as in Example I above. After stripping the acetone and gas, the viscosity of the stable latex product is 15 cps at 25° C. on a Brookfield viscometer, and the solids content is 35.3%.

C. A film, dried from the latex of B. above, following the procedure in Example I above, at 135° C.-150° C. for 20 minutes, is a high quality, high strength film which retains a substantial portion of its strength when immersed in water at 70° C. for 24 hours.

EXAMPLE IX

A. A latex is formed utilizing 100 grams of the prepolymer in Example I above, admixed with 4.3 g of styrene-maleic anhydride copolymer having a molecular weight of about 1000 in 20 grams of acetone, 1.7 g of the ethoxylated nonyl phenol, and 0.17 g of cetyl alcohol. After completely mixing, 210 parts of water containing 1 drop of triethylene diamine is added and mixing is continued as in Example I. A stable latex is formed, having a viscosity of less than 100 cps at 25° C. as measured on a Brookfield viscometer.

B. A film is drawn on a Mylar sheet utilizing the latex formed in A. After air drying overnight at ambient temperatures, then drying in an oven at 110° C. for 15 minutes, it is immersed in 70° C. water for 16 hours. The film turned a faint blue but retains its clarity and a substantial portion of its original tensile strength.

EXAMPLE X

A. A prepolymer is formed from a mixture of isocyanates utilizing the following materials:

|  | Equiv. Weight | Equiv. Used | Wt. Used (Grams) |
|---|---|---|---|
| PPG (OH No.=27.2) | 2060.0 | 0.050 | 103.0 |
| PPG (OH No.=56.8) | 988.0 | 0.104 | 103.0 |
| N-methyldiethanol amine (NMDEA) | 59.5 | 0.168 | 10.0 |
| Trimethylol propane (TMP) | 44.7 | 0.050 | 2.2 |
| Tolylene-diisocyanate (TDI) | 88.0 | 0.726 | 64.0 |
| Methylene bis (4-cyclohexyl isocyanate) | 134.0 | 0.050 | 6.7 |
| Dimethyl sulfate (DMS) | 126.0 | 0.084 | 10.6 |

The polyols are admixed and dried under vacuum at 80° C. for 20 minutes. The TMP and NMDEA are then added, and the mixture cooled to 25° to 30° C. The two diisocyanates are added to the reaction mixture. The mixture is heated to about 70° C., with continued mixing until the isocyanate content is 5.9%. Dimethyl sulfate is then added to the reaction mixture and the heating and mixing continued to a final NCO content of 5.7%.

B. A stable latex is prepared utilizing the prepolymer of A. above, by admixing 100 grams of the prepolymer with 2.2 grams of the ethoxylated nonyl phenol emulsifier, and 5 grams of the diglycidyl ether of bisphenol A. and 100 grams of deionized water. After about 3 hours of mixing during which the temperature did not exceed about 35° C., a latex product formed which after degassing and removing acetone, has a solid content of 50%.

C. A film from the latex in B. above, made in accordance with the procedure of Example I onto a Mylar sheet, is dried overnight at ambient temperatures, and then heated at 150° C. for 10 minutes. The film shows excellent mechanical properties and after immersion in 70° C. water for 24 hours, the wet film retains 50% of its original tensile strength.

EXAMPLE XI

A. A prepolymer is prepared from isophorone diisocyanate (IPDI) utilizing the following materials:

|  | Equiv. Weight | Equiv. Used | Wt. Used (Grams) |
|---|---|---|---|
| PPG (OH No. of 56.1) | 1000.0 | 1.10 | 1100.0 |
| TMP | 44.7 | 0.537 | 24.0 |
| NMDEA | 59.5 | 1.00 | 59.5 |
| Isophorone di-isocyanate (IPDI) | 111.0 | 5.274 | 585.4 |
| DMS | 126.0 | 0.50 | 63.0 |

-continued

|  | Equiv. Weight | Equiv. Used | Wt. Used (Grams) |
|---|---|---|---|
| Acetone |  |  | 195.0 |

After drying the glycol under vacuum at 80° C. for a half hour, the TMP is added while still hot. The mixture is cooled to below 60° C. and NMDEA is added. After further cooling to 30° C., the di-isocyanate is added, followed by 11 drops of dibutyltin dilaurate catalyst. The material is permitted to react for 4 hours until the isocyanate (—NCO) content is 6.30% by weight. The acetone is then added with continued vigorous stirring, followed by the dimethyl sulfate and the mixture stirred for an additional hour. The —NCO content of the prepolymer is 5.50% by weight.

B. A stable latex is formed utilizing the prepolymer prepared in A above in accordance with the procedure of Example I above.

C. A film is formed utilizing the latex prepared in B above, in accordance with the procedure of Example I above. The dried film has excellent mechanical properties which are substantially retained after immersion in 70° C. water for 16 hours.

EXAMPLE XII

A. A prepolymer is prepared in accordance with the following procedure using the following materials:

|  | Weight (Grams) | Equivalent |
|---|---|---|
| PPG (OH No.=56.1) | 100 | 0.1 |
| NMDEA | 5.95 | 0.1 |
| MBCI | 52.5 | 0.4 |
| DMS | 6.3 | 0.05 |
| Acetone (dry) | 15 | — |

A 500 ml. 4-necked flask equipped with a stirrer, thermometer and gas inlet and outlet tube is charged with the glycol. The glycol is initially dehydrated by heating to 80° C. under reduced pressure for one half-hour. After dehydration, the flask is cooled to about 25° C. and blanketed with nitrogen before the NMDEA is introduced. The MBCI is next added with a drop of dibutyltin dilaurate with continued good stirring. An exotherm develops which increases the temperature of the reaction mixture from 25° C. to about 55° C., and is maintained for about 1½ hours. After cooling to 35° C. with continued stirring, the DMS and acetone are simultaneously added, resulting in a further exotherm, whereby the temperature increases to 43° C. The mixing is continued for another hour, during which time the reaction mixture maintains itself at between 40° and 45° C. The isocyanate content (—NCO) of the quaternized polyether-urethane prepolymer is about 5.0% by weight.

B. The quaternized prepolymer of A. above is used to form a stable latex, by admixing all of the prepolymer formed into a 500 ml resin kettle, equipped with a stirrer and thermometer, to which is added 2 weight percent ethoxylated nonyl phenol emulsifier and the mixture is stirred for 10 minutes. Sufficient deionized water, to which has been added a couple of drops of a 33% solution of triethylene diamine in diethylene glycol, is added to produce a latex containing about 30% by weight solids. An anti-foam agent is then added. The temperature of the reaction mixture increases from 25° C. to 34° C. Stirring is continued for about 1 hour and acetone and any remaining dissolved gas are then stripped by vacuum. The latex has a solids content of about 35% and a viscosity of 15 centipoise at 25° C., as measured on a Brookfield viscometer.

Following the foregoing latex formation, glyoxal in water (40% TNV) is added, with mixing, using about 7.5 parts per 100 parts of the latex.

B. The glyoxal containing latex is then poured onto a Mylar sheet and dried overnight at ambient temperature and then further dried at 110° C. for 5 minutes, followed by 10 minutes at 150° C. The conditioned film has excellent mechanical properties and has excellent resistance to deterioration of mechanical properties even after immersion in 70° C. water for 24 hours.

The patentable embodiments of the present invention which are claimed are as follows:

1. A storage-stable latex of a quaternized polyurethane-urea comprising the chain-extended product of an isocyanate terminated quaternized polyurethane prepolymer, a chain-extending reagent and water, said chain-extending reagent having at least two groups reactive with primary amines, said groups selected from terminal epoxides, aldehydes and cyclic anhydrides said prepolymer being the reaction product of a polyol, a tertiary alkanolamine and a polyisocyanate quaternized with a di-lower alkyl sulfate.

2. The latex of claim 1, wherein the polyol is selected from the group consisting of diols, triols, and mixtures thereof, said polyol or mixtures thereof, having a hydroxyl number in the range of from about 10 to about 200.

3. The latex of claim 2, wherein the polyol is a polyether polyol.

4. The latex of claim 2, wherein the polyol is a polyester polyol.

5. The latex of claim 2, wherein the polyisocyanate is a diisocyanate.

6. The latex of claim 5, wherein the chain-extending reagents are poly-epoxides selected from the group consisting of di-epoxides and tri-epoxides.

7. The latex of claim 6, wherein the polyepoxides comprise glycidyl ether groups.

8. The latex of claim 1, wherein the prepolymer is the reaction product formed by reacting a polyol, a diisocyanate and an N-alkyl dialkanolamine in the proportion of equivalents in the range of from about 0.8 to about 1.2: about 3 to about 5: about 0.8 to about 1.2, respectively, and quaternized by reaction with from about 0.4 to 0.6 equivalent of the dialkyl sulfate.

9. The latex of claim 8, wherein the prepolymer contains an amount of free isocyanate groups in the range of from about 0.5 to about 10% by weight.

10. The latex of claim 9, wherein the chain-extending reagent is present in an amount of from about 1 to about 15% by weight of the prepolymer.

11. The latex of claim 1, containing up to about 65% by weight of polymer solids.

12. In the process for the preparation of a storage-stable latex, comprising reacting a mixture of a polyol with a tertiary alkanolamine and an excess of a polyisocyanate under anhydrous conditions to form an isocyanate terminated polyurethane prepolymer, quaternizing the polyurethane prepolymer by further reaction under anhydrous conditions with a quaternizing agent, the improvement of simultaneously chain-extending and dispersing the quaternized isocyanate-terminated polyurethane prepolymer in an excess of water in the presence of an emulsifying surfactant and a chain-extending reagent having at least two groups reactive with primary amines, said groups selected from terminal epoxides, aldehydes and cyclic anhydrides.

13. The process of claim 12, comprising, in addition, the presence of an N-lower alkyl dialkanolamine, in combination with the polyol and polyisocyanate compounds.

14. The process of claim 13, wherein the diisocyanate is selected from the group consisting of tolylene diisocyanate and methylene bis-(cyclohexyl isocyanate).

15. The process of claim 12, wherein the polyol is a polyoxyalkylene polyol.

16. The process of claim 15, wherein the polyol comprises a diol having a hydroxyl number in the range of from about 20 to about 80.

17. The process of claim 16, wherein the diol is a polyoxypropyleneglycol.

18. The process of claim 17, wherein the polyol comprises in addition, up to 10% of an alkyl triol, based on the weight of diol.

19. The process of claim 18, wherein the alkyl triol is trimethylol propane.

20. The process of claim 18, wherein the alkyl triol is glycerol.

21. The process of claim 13, wherein the quaternizing agent is dimethyl sulfate.

22. The process of claim 12, wherein the quaternization is carried out in a nonaqueous, organic solvent medium, and wherein the organic solvent is removed after the quaternized prepolymer is dispersed in water.

23. The process of claim 12, wherein the water and prepolymer are reacted in the presence of a catalyst to form a chain-extended polyurethane-urea, being dispersed in an aqueous medium, and wherein the chain-extending reagent is subsequently added to form the resultant latex.

24. The process of claim 23, wherein the chain-extending reagent comprises a polyaldehyde containing from two to three aldehyde groups.

25. A film produced by drying the latex of claim 1.

26. A laminated product comprising a lower substrate and upper substrate and an intermediate adhesive film, adhesively connected to the upper substrate and the lower substrate, the film being formed by applying a layer of the latex of claim 1 to at least one of said substrates and juxtaposing the second substrate adjacent the first substrate in contact with the latex layer, and drying the latex to form the desired adhesive film.

27. A laminated product comprising a substrate and an adherent film, adhesively connected to a surface of the substrate, the film being formed by applying a layer of the latex of claim 1 to said surface and drying the layer.

* * * * *